United States Patent
Miller et al.

(10) Patent No.: US 9,829,133 B2
(45) Date of Patent: Nov. 28, 2017

(54) ISOLATION RING ON GAP SUB

(71) Applicant: GE Energy Oilfield Technology, Inc., Farnborough (GB)

(72) Inventors: Mark Miller, Houston, TX (US); Craig MacDonald, Houston, TX (US); Michael Doan, Missouri City, TX (US)

(73) Assignee: GE Energy Oil Field Technology Inc., Houston, TX (US)

( * ) Notice: Subject to any disclaimer, the term of this patent is extended or adjusted under 35 U.S.C. 154(b) by 997 days.

(21) Appl. No.: 13/858,690

(22) Filed: Apr. 8, 2013

(65) Prior Publication Data

US 2014/0049036 A1 Feb. 20, 2014

Related U.S. Application Data

(60) Provisional application No. 61/683,271, filed on Aug. 15, 2012, provisional application No. 61/781,617, filed on Mar. 14, 2013.

(51) Int. Cl.
*F16L 25/02* (2006.01)
*E21B 17/00* (2006.01)
(Continued)

(52) U.S. Cl.
CPC .......... *F16L 25/021* (2013.01); *E21B 17/003* (2013.01); *E21B 17/042* (2013.01); *E21B 47/122* (2013.01)

(58) Field of Classification Search
USPC ....... 285/48, 293.1, 333–334, 355, 390, 913
See application file for complete search history.

(56) References Cited

U.S. PATENT DOCUMENTS 2,104,799 A * 1/1938 Evans ................... F16L 15/003
277/605
2,752,579 A * 6/1956 Caldwell ............... F16L 25/023
174/85
(Continued)

FOREIGN PATENT DOCUMENTS

| CN | 102305029 A | 1/2012 |
| CN | 202348135 U | 7/2012 |
| WO | 2010121346 A1 | 10/2010 |

OTHER PUBLICATIONS

The International Search Report and The Written Opinion of the International Searching Authority mailed Nov. 1, 2013 in related PCT Application PCT/US2013/052928.
(Continued)

*Primary Examiner* — Aaron Dunwoody
*Assistant Examiner* — Fannie Kee
(74) *Attorney, Agent, or Firm* — GE Global Patent Operation

(57) ABSTRACT

A gap sub comprises at least one electrically isolating threaded joint in a conductive tubular collar. The threads of the joints are isolated by a non-conductive coating. The shoulders of the joints are separated by an isolating ring. Annular faces on the ring make contact with the shoulders in the joints. The ring is made of conductive material with a non-conductive coating deployed on (1) at least one of the ring's annular faces, and (2) the interior surface of the ring. An annular recess in the collar prevents electrical contact between collar sections nearby the ring on either side of at least one threaded joint.

20 Claims, 2 Drawing Sheets

(51) Int. Cl.
*E21B 47/12* (2012.01)
*E21B 17/042* (2006.01)

(56) References Cited

U.S. PATENT DOCUMENTS

| | | | | |
|---|---|---|---|---|
| RE25,047 E | * | 10/1961 | Risley | F16L 25/023 |
| | | | | 285/48 |
| 3,150,889 A | * | 9/1964 | Watts | F16L 15/003 |
| | | | | 277/622 |
| 3,489,438 A | * | 1/1970 | McClure | E21B 17/18 |
| | | | | 175/215 |
| 3,822,902 A | * | 7/1974 | Maurer | E21B 17/042 |
| | | | | 285/332.2 |
| 4,348,672 A | | 9/1982 | Givler | |
| 4,496,174 A | | 1/1985 | McDonald et al. | |
| 6,439,324 B1 | | 8/2002 | Ringgenberg | |
| 7,032,930 B2 | * | 4/2006 | Sutherland | E21B 17/003 |
| | | | | 175/320 |
| 7,151,466 B2 | | 12/2006 | Gabelmann et al. | |
| 7,255,183 B2 | * | 8/2007 | Cramer | E21B 17/028 |
| | | | | 166/242.6 |
| 7,387,167 B2 | | 6/2008 | Fraser et al. | |
| 8,154,420 B2 | | 4/2012 | Petrovic et al. | |
| 2004/0206510 A1 | | 10/2004 | Fraser et al. | |
| 2005/0068703 A1 | | 3/2005 | Dopf et al. | |
| 2005/0167098 A1 | | 8/2005 | Lovell et al. | |
| 2006/0202852 A1 | | 9/2006 | Peter et al. | |
| 2007/0247328 A1 | | 10/2007 | Petrovic et al. | |
| 2009/0066334 A1 | | 3/2009 | Peter | |
| 2010/0033344 A1 | | 2/2010 | Rozenblit et al. | |
| 2010/0043229 A1 | | 2/2010 | Camwell et al. | |
| 2011/0254695 A1 | | 10/2011 | Camwell et al. | |

OTHER PUBLICATIONS

A Search Report and Written Opinion issued in connection with corresponding EP Application No. 13829488.9 on Sep. 30, 2016.
Unofficial English Translation of Chinese Office Action issued in connection with corresponding CN Application No. 01380043282.7 on Oct. 10, 2016.

* cited by examiner

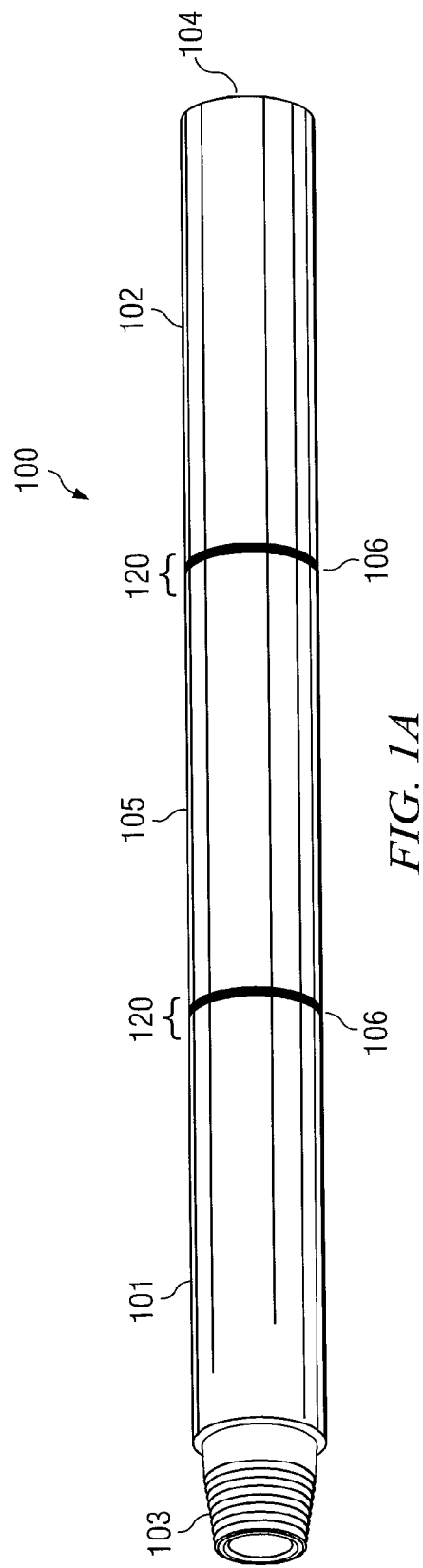
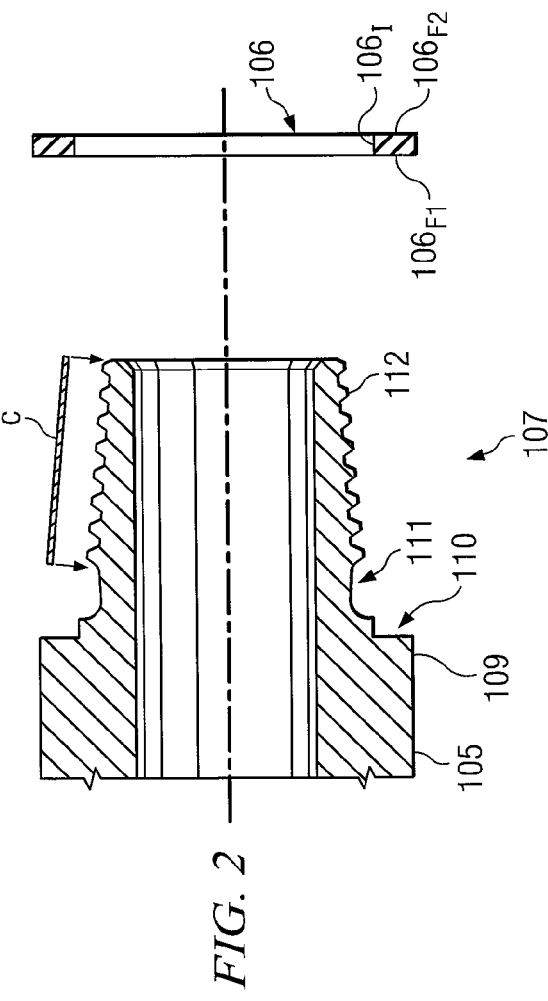
FIG. 1A
FIG. 2

ISOLATION RING ON GAP SUB

RELATED APPLICATIONS

This application claims the benefit of, and priority to, both of the following two commonly-invented U.S. Provisional Applications: (1) Ser. No. 61/683,271, filed Aug. 15, 2012; and (2) Ser. No. 61/781,617, filed Mar. 14, 2013.

FIELD OF THE INVENTION

This disclosure is directed generally to technology useful in measurement-while-drilling ("MWD") applications in the oil and gas exploration field, and more specifically to isolation technology in electromagnetic ("EM") telemetry.

BACKGROUND OF THE INVENTION

Ultra-low frequency (ULF) electromagnetic (EM) waves are the preferred transmission mechanism for wireless subterranean telemetry applications due to the ULF wave's ability to propagate long distances through the Earth's strata. In a typical subterranean telemetry application, the desired telemetry information is digitally encoded into data packets and sent as modulated "bursts" of ULF carrier waves. Transmission of the carrier waves is physically facilitated by injecting a modulated current into the Earth media using a power amplifier to create a time-varying voltage potential between two transmit electrodes coupled to the Earth media. The electrodes are spaced such that the induced current traverses a section of the Earth media creating associated electric and magnetic field energy which radiates as time-varying wave fronts through the Earth media.

According to a conventional EM telemetry system, a lower portion of drill string is typically isolated electrically from the upper portion, so that the electrically-isolated lower portion may act as an antenna to transmit or receive ULF carrier waves to or from the surface through the Earth's strata. Transmission and reception by the antenna is enabled by circuitry within a transceiver located in the lower drill string portion below the point of electrical isolation. The transceiver is conventionally deployed in an antenna sub located just below the point of electrical isolation. In receive mode, the transceiver is connected to the lower drill string portion acting as an antenna that is electrically isolated from the surface. The transceiver may thus receive EM waves propagated from the surface through the Earth's strata. In transmit mode, the transceiver's tendency is to want to transmit using the entire drill string as an antenna. However, EM waves propagated by the transceiver are forced to "jump" the point of electrical isolation by passing through the surrounding Earth media. In so doing, the EM waves are thus forced to propagate through the Earth's media, where they may be received by the surface antennae. The EM system may therefore enable tools on the drill string to intercommunicate with the surface via encoded data packets modulated onto the transceived carrier waves.

In order for the lower drill string portion configured as an antenna to work well, the lower portion should ideally be electrically isolated from the upper portion as completely as possible. Any loss in complete electrical isolation will cause the lower drill string to start to lose its character as an antenna, reducing the effectiveness of the EM system in communicating via the Earth's strata. This need for as complete an electrical isolation as possible is magnified in view of the "reality" of the high impedance of the Earth's strata through which the carrier waves must pass in normal operational mode. In order to encourage robust wave propagation through the Earth's strata (and deter wave propagation losses to ground via the upper portion of the drill string), the impedance of the electrical isolation must be correspondingly even higher. It will be appreciated, however, that in practice, complete electrical isolation is rarely achievable. Most operational isolations will be "lossy" to some degree. A goal of electrical isolation of the drill string in EM telemetry is thus to minimize "lossiness" to as close to "no losses" as possible.

A further "reality" is that the EM waves transmitted by the transceiver on the drill string are likely to be weak in comparison to their counterparts transmitted from the surface. Local power available to a transceiver on a tool string is limited. Thus, any wave propagation loss via poor isolation between upper and lower portions of the drill string is likely to cause a magnified reduction in effectiveness of the tool string transceiver's transmissions, as compared to surface transmissions.

Electrical isolation of the upper and lower portions of the drill string is frequently enabled by placement of "gap sub" technology in the drill string at the point at which isolation is desired. The gap sub technology provides isolating structure to prevent, as completely as possible, any electrical conductivity through the drill string between the portions of the drill string above and below the gap sub technology.

This disclosure uses the term "gap sub technology" in the previous paragraph because in alternative deployments, the electrical isolation of the upper and lower portions of the drill string may be achieved using differing arrangements. For example, electrical isolation may be enabled by deploying a single integrated electrical break in one or more locations on the drill string, where such electrical break(s) are integrated and continuous across the tubular drill collar and the tooling within the drill collar. In other arrangements, electrical isolation may be enabled via separate but cooperating electrical breaks: one (or more) electrical break(s) on the tubular drill collar, plus one (or more) separate electrical break(s) within the tooling structure deployed inside the collar. This disclosure pertains to the latter (separate but cooperating) arrangement, and specifically to electrical isolation of the drill collar itself.

By way of further explanation, the drill string often, at and around the desired point of isolation, comprises operational downhole tool structure deployed inside a hollow cylindrical outer collar. The collar generally refers to a string of concatenated hollow tubulars made from non-magnetic material, usually stainless steel. In such a deployment, it is often advantageous to make separate but cooperating physical electrical breaks in both the tooling and in the collar itself in order to achieve overall electrical isolation of the entire drill string.

Inside the collar, an "internal gap" is provided, usually positioned just above the transceiver tooling. The internal gap electrically isolates the drill collar internals below the internal gap from the drill collar internals above the internal gap. As noted, this disclosure is not directed to the internal gap.

On the collar itself, a "gap sub" is provided, comprising a hollow tubular inserted in the concatenation of hollow tubulars that comprise the collar. The concatenated connections of the collar are conventionally pin and box threaded connections, and the collar itself is conventionally a non-magnetic material (usually stainless steel). The gap sub is thus conventionally a non-magnetic tubular with pin and box connections at either end, configured to be inserted at a desired position in a concatenated string of similarly-connected non-magnetic drill collar tubulars. It will be appreciated that the collar, in and of itself, is a portion of the overall drill string. Functionally, therefore, the gap sub electrically isolates the portions of the drill collar (and therefore, by extension, the entire drill string) above and below the gap sub.

This disclosure is directed to an improved gap sub, providing excellent (almost complete) electrical isolation of the non-magnetic collar above and below the gap sub. The improved gap sub has further demonstrated excellent performance in operating conditions historically known to cause the isolating structure of prior art gap subs to break down or fail, causing unacceptable loss of isolation (and corresponding loss in EM telemetry) during live drilling operations.

SUMMARY OF THE INVENTION

The present invention addresses one or more of the above-described drawbacks of the prior art. In preferred embodiments, a gap sub is provided in which the improvement comprises generally an isolating ring made out of conductive material. In a preferred embodiment, the conductive material is a non-magnetic material such as stainless steel. The gap sub comprises at least one, and in a preferred embodiment, two electrically-isolating threaded joints in a non-magnetic tubular collar. The threads of the joints are isolated by a non-conductive coating, which may be deployed on the outside of the pin threads in accordance with the prior art. The shoulders of the joints are separated by the disclosed new isolating ring, wherein the ring is coated with non-conductive material on (1) at least one, and advantageously both, of its upper and lower faces, and (2) its interior surface. An annular recess in the collar prevents electrical contact between collar sections nearby the ring either side of each threaded joint. In the preferred embodiment, the non-conductive coating is a ceramic coating. The coating itself and its method of deployment may be in accordance with the prior art. The combination of (1) the non-conductive coating ring isolating the shoulders of the joint, and (2) the non-conductive coating between mating threads on the joint enables a robust electrical isolation either side of each threaded joint.

It is therefore a technical advantage of the disclosed gap sub to provide excellent (almost complete) drill collar isolation either side of the above-described electrically isolating threaded joints. As noted, when one, and advantageously two, of the above described threaded joints are deployed, the combination of (1) the non-conductive coating ring isolating the shoulders of the joint, and (2) the non-conductive coating between mating threads on the joint, enables a robust electrical isolation either side of the joint. As a result, optimized EM wave propagation is provided back and forth through the Earth's strata between the lower drill string (i.e. below the gap sub) and the surface.

A further technical advantage of the disclosed gap sub is to provide sustained electrical isolation either side of the above-disclosed threaded joints in operating conditions. Modern directional drilling operations require the drill string to undergo bending loads as the borehole changes direction. Historically, such bending loads have been known to crack or fracture electrically isolating coatings deployed on previous gap subs, causing loss in isolation. However, the non-conductive coatings as configured on the new gap sub disclosed herein (and particularly on the coated non-magnetic ring) have been shown to be very robust, even when the gap sub is undergoing high operational bending loads.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates, in perspective view, a presently preferred embodiment of an assembled drill collar gap sub in accordance with the present disclosure;

FIG. 2 illustrates, in cross-section view, isolating pin connection 107 (as indicated on FIG. 1B) in detail, in further cooperation with isolating ring 106.

DETAILED DESCRIPTION

Figure 1B:
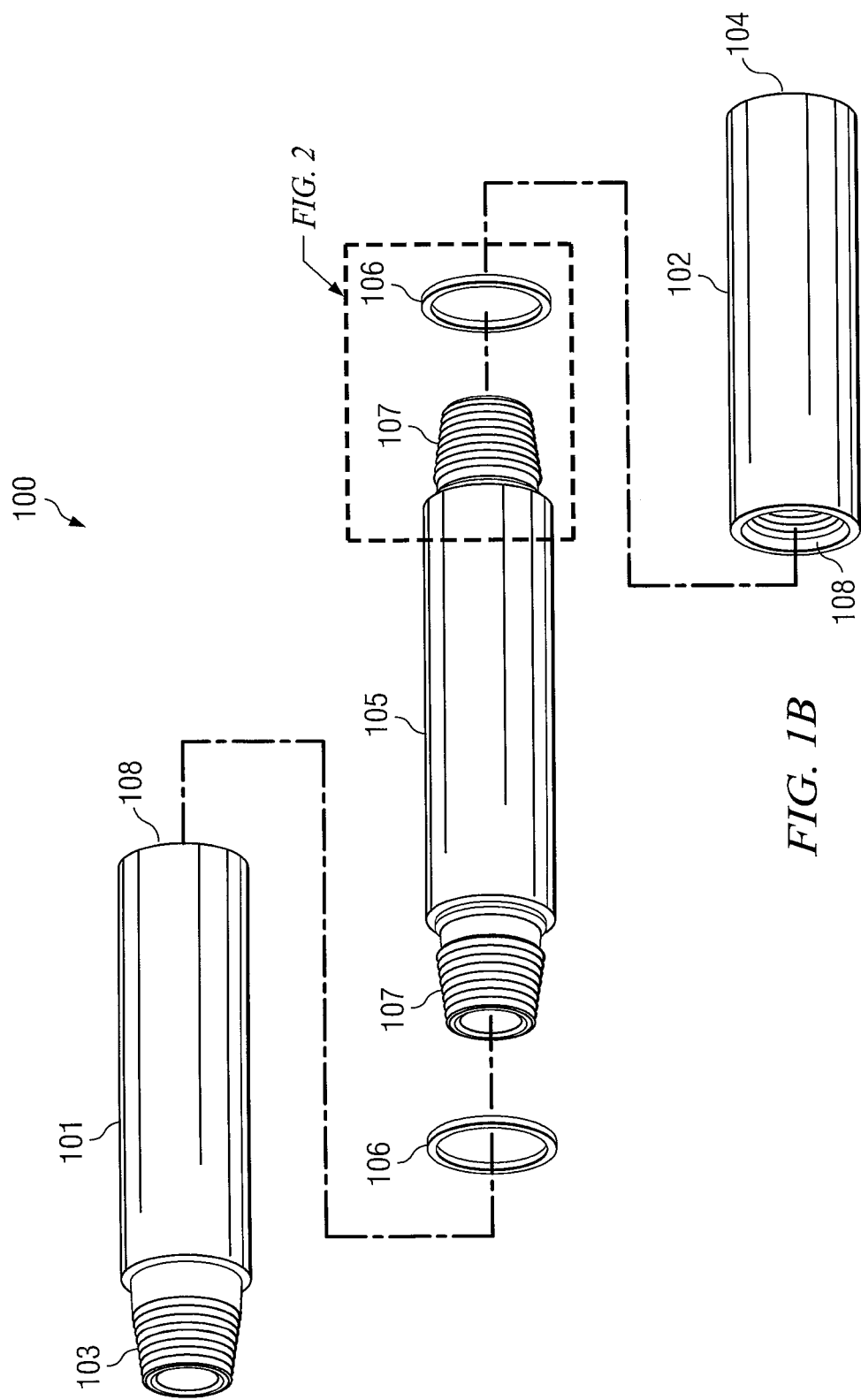
FIG. 1B illustrates, again in perspective view, the gap sub of FIG. 1A in disassembled form.

FIGS. 1A and 1B illustrate, in assembled and disassembled views respectively, a presently preferred embodiment of a tubular drill collar gap sub 100. In FIG. 1A, gap sub 100 comprises pin end portion 101 and box end portion 102 separating isolating portion 105. Isolating rings 106 are provided at either end of isolating portion 105. One isolating ring 106 is included in each of two threaded isolating joints 120 (one threaded isolating joint 120 between pin end portion 101 and isolating portion 105, the other threaded isolating joint 120 between isolating portion 105 and box end portion 102). All the components illustrated on FIG. 1A (pin end portion 101, isolating portion 105, box end portion 102 and isolating rings 106) are made from a non-magnetic material such as stainless steel.

It will be appreciated that gap sub 100, fully assembled as depicted in FIG. 1A, is disposed to be inserted into the drill string. More, precisely, as described earlier in this disclosure, fully assembled gap sub 100 may be inserted into a concatenated string of non-magnetic drill collar tubulars. With further reference to FIG. 1A, conventional pin connection 103 and box connection 104 (hidden from view on FIG. 1A) at either end of fully assembled gap sub 100 enable such insertion into the concatenated string of drill collar tubulars. When inserted into the drill collar string, gap sub 100 provides electrical isolation within the drill collar either side of gap sub 100. The concatenated string of non-magnetic drill collar tubulars is in turn connected at either end to other (upper and lower) portions of the entire drill string. Gap sub 100 thus provides electrical isolation in the drill collar between the upper and lower portions of the entire drill string.

As noted, FIG. 1B illustrates gap sub 100 from FIG. 1A in disassembled form. All the items called out by part number on FIG. 1A are illustrated on FIG. 1B by the same part number. Disassembly of gap sub 100 as shown in FIG. 1B allows further illustration of the threaded isolating joints 120 (identified on FIG. 1A) at each end of isolating portion 105. FIG. 1B shows isolating portion 105 including isolating pin connections 107 at each end, each isolating pin connection 107 configured to be received into a mating isolating box connection 108 on pin end portion 101 and box end portion 102 respectively. FIG. 1B also depicts isolating rings 106 inserted into the threaded isolating joints between isolating portion 105 and pin end portion 101, and between isolating portion 105 and box end portion 102.

FIG. 2 illustrates isolating pin connection 107 from FIG. 1B in more detail, per the view indicated on FIG. 1B. It will be understood, however, that although FIG. 2 illustrates isolating pin connection 107 near box end portion 102 (per FIG. 1B), the details illustrated on FIG. 2 are functionally and structurally the same for isolating pin connection 107 near pin end portion 101 (also per FIG. 1B).

Referring now to FIG. 2, isolating pin connection 107 comprises male threads 112 at the end thereof. Male threads 112 are coated (functionally depicted as item C on FIG. 2) with a non-conductive coating as is known in the art. In a presently preferred embodiment, the non-conductive coating is a ceramic coating. Further, as is known in the art, male threads 112 are sized, shaped and configured so that once coated with the non-conductive coating, the coated male threads 12 mate with corresponding female threads on isolating box connection 108 on box end portion 102 (items 108 and 102 not shown on FIG. 2 for clarity, but depicted on FIG. 1B).

FIG. 2 also depicts isolating ring 106 disposed to be received into ring cutout 110 on isolation portion 105 (item 110 described in more detail immediately below). Although not illustrated on FIG. 2, it will be understood that isolating ring 106 receives a non-conductive coating on face surfaces $106_{F1}$ and $106_{F2}$, and on interior surface $106_I$. In a preferred embodiment, the non-conductive coating on isolating ring 106 is a ceramic coating. It should be noted that testing has revealed that coating the entire isolating ring (i.e. on the exterior ring surface as well as on face surfaces $106_{F1}$ and $106_{F2}$, and interior surface $106_I$) is not particularly advantageous. It has been found that under operating conditions, the coating on the exterior ring surface chips and cracks quite quickly. These chips and cracks propagate and extend into the coating on the face surfaces $106_{F1}$ and $106_{F2}$, causing premature breakdown in electrical isolation. It has been observed that the coating on face surfaces $106_{F1}$ and $106_{F2}$ performs much better when there is no coating on the exterior ring surface.

With further reference to FIG. 2, isolating pin connection 107 also comprises a shoulder 109 at the point at which isolating portion 105 transitions into male threads 112. Shoulder 109 is separated from male threads 112 by ring cutout 110 and recess 111. Ring cutout 110 is sized and shaped to receive isolating ring 106 after a non-conductive coating has been applied to isolating ring 106, as described immediately above. Recess 111 is positioned, sized and contoured so that when isolating ring 106 is received into ring cutout 110, and when male threads 112 are operationally engaged on corresponding female threads on isolating box connection 108 (item 108 omitted for clarity on FIG. 2), there is no physical (or electrical) contact between isolating portion 105 and box end portion 102 (item 102 omitted for clarity) except via threaded engagement of male threads 112 or via contact through isolating ring 106.

Functionally complete isolation is thus achieved. Since male threads 112 have a non-conductive coating, electrical isolation across threaded engagement of male threads 112 is enabled. Moreover, since isolating ring 106 also has a non-conductive coating, electrical isolation across shoulder 109 is also enabled. As noted above, recess 111 prevents any other physical (or electrical) contact between isolating portion 105 and box end portion 102 (item 102 shown on FIG. 1B but omitted for clarity on FIG. 2).

Field testing has shown operational drill collar gap subs designed in accordance with this disclosure have shown excellent (almost complete) isolation in normal directional drilling service. Isolating ring 106 (per FIG. 1B) has the compressive strength and durability of a non-magnetic metal while still providing electrical isolation via its coating. As such, it is theorized that this hybrid nature of isolating ring 106's properties enables superior performance.

Field testing has further shown that gap subs designed in accordance with this disclosure also show good isolation performance (and limited damage to non-conductive coatings) even when placed under high bending loads associated with elevated build rates. For example, one test was designed to simulate placing the gap sub downhole and subjecting it to approximately 140 continuous hours at a maximum operating bending stress that might be expected during directional drilling. In this test, bending stress was exerted on the gap sub equivalent to a simulated build of a 12° dogleg. This bending stress was imparted to the gap sub 25.2 times per second over a 6 hour period. Electrical isolation remained substantially complete and unchanged throughout the entire test.

The following paragraphs describe further alternative embodiments which, although not illustrated, are considered within the scope of this disclosure and the inventive material described herein.

It will be seen on FIG. 1B that an isolating pin connection 107 is provided on each end of isolating portion 105. This is to simplify manufacturing. It is understood in the art that it is easier to deploy robust and precise non-conductive thread coatings on male threads on a pin end than on female threads in a box end. Thus, by providing an isolating pin connection on each end of isolating portion 105, only one tubular (isolation portion 105) need be handled to receive a non-conductive coating for two isolating thread joints. Absent manufacturing economy and convenience, however, other embodiments may deploy isolating pin connection 107 on pin end portion 101 and/or box end portion 102 with equivalent enabling effect.

As noted, the presently preferred non-conductive coating on male threads 112 and isolating ring 106 (per FIG. 2) is a ceramic coating. This is because a ceramic coating has demonstrated good performance in gap subs designed in accordance with this disclosure. However, the disclosure is not limited in this regard. Other non-conductive coatings (such as, for example, plastics, fiberglass or composites) could be used with equivalent enabling effect.

The presently preferred embodiment described in this disclosure illustrates gap sub 100 with two threaded isolation joints 120 (per FIG. 1A). Nothing in this disclosure should be interpreted to limit the disclosure to two isolation joints, however. Other embodiments of gap sub 100 may deploy only one isolation joint, or more than two isolation joints, depending on user and service requirements. In embodiments where there is to be only threaded one isolation joint 120, it will be appreciated that, with further reference to FIGS. 1A and 1B, box end portion 102 may be eliminated, and isolating pin connection 107 near box end portion 102 may be substituted for a conventional box connection. In embodiments where there are to be more than two threaded isolation joints 120, additional isolating portions 105 may be deployed between pin end portion 101 and box end portion 102, with associated additional structure per FIG. 2 deployed on such additional isolating portions 105.

It will be appreciated that throughout this disclosure, pin and box connections have been called out and identified according to a presently preferred embodiment. Nothing herein should be interpreted, however, to limit this disclosure to require a pin connection or a box connection at a particular location. It will be understood that pin connections and box connections may be deployed interchangeably on parts that thread together.

This disclosure has described a gap sub that is made entirely of a non-magnetic material (such as stainless steel) in a presently preferred embodiment. However, the scope of this disclosure is not limited to non-magnetic material. It will be appreciated that parts (or all) of the gap sub may alternatively be made of other serviceable materials (including magnetic materials such as carbon steel) with equivalent enabling effect.

Although the present invention and its advantages have been described in detail, it should be understood that various changes, substitutions and alternations can be made herein without departing from the spirit and scope of the invention as defined by the appended claims.

We claim:

1. A gap sub, comprising:
   a tubular drill collar sub, the drill collar sub including a conductive hollow cylindrical pin body and a conductive hollow cylindrical box body, the cylindrical pin body and the cylindrical box body configured to mate via an electrically-isolated threaded connection;
   at least one end of the cylindrical box body terminating with a threaded box connection, the threaded box connection including a threaded box end profile, the threaded box end profile including a planar annular box end surface on a distal end thereof, the box end surface oriented on a plane substantially transverse to a longitudinal axis of the cylindrical box body;
   at least one end of the cylindrical pin body terminating with a threaded pin connection, the threaded pin connection including a threaded pin end profile configured to mate with the threaded box end profile, a first non-conductive coating deployed on threads on at least one of the threaded pin end profile and the threaded box end profile;
   the cylindrical pin body transitioning into the threaded pin end profile via an isolating portion, the isolating portion including a shoulder formed in the cylindrical pin body, the shoulder including a planar annular shoulder face, the shoulder face oriented on a plane substantially transverse to a longitudinal axis of the cylindrical pin body and a ring cutout;
   an isolating ring made from conductive material, the isolating ring including first and second planar annular ring faces, a second non-conductive coating deployed on at least one of the first and second annular ring faces;
   the isolating ring further including cylindrical inner and outer ring surfaces;
   the isolating ring sized to fit over the threaded pin connection and onto the shoulder face, the isolating ring further configured to separate the shoulder face from the box end surface when the threaded box end profile is threadably engaged on the threaded pin end profile, and the isolating ring configured to be disposed in the ring cutout; and
   the isolating portion further including an annular recess formed in the cylindrical pin body such that the recess prevents the cylindrical box body from making contact with the cylindrical pin body nearby the isolating ring when the threaded box end profile is threadably engaged on the threaded pin end profile with the isolating ring located therebetween.

2. The gap sub of claim 1, in which the second non-conductive coating is deployed on the inner ring surface and on both of the first and second annular ring faces.

3. The gap sub of claim 1, in which any non-conductive coating is avoided on the outer ring surface.

4. The gap sub of claim 1, in which the first non-conductive coating is deployed on threads on both of the threaded pin end profile and the threaded box end profile.

5. The gap sub of claim 1, in which the first and second non-conductive coatings are selected from the group consisting of:
   (a) ceramic;
   (b) plastic;
   (c) fiberglass; and
   (d) composite.

6. The gap sub of claim 1, in which at least one of the group consisting of the cylindrical box body, the cylindrical pin body and the isolating ring is made from non-magnetic material.

7. The gap sub of claim 1, in which at least one of the group consisting of the cylindrical box body, the cylindrical pin body and the isolating ring is made from a material selected from the group consisting of:
   (a) stainless steel; and
   (b) carbon steel.

8. A gap sub, comprising:
   a tubular drill collar sub, the drill collar sub including a conductive hollow cylindrical pin body and two conductive hollow cylindrical box bodies, the cylindrical pin body and the cylindrical box bodies configured to mate together via electrically-isolated threaded connections;
   at least one end of each cylindrical box body terminating with a common threaded box connection, each threaded box connection including a threaded box end profile, each threaded box end profile including a planar annular box end surface on a distal end thereof, each box end surface oriented on a plane substantially transverse to a longitudinal axis of the corresponding cylindrical box body;
   both ends of the cylindrical pin body terminating with a common threaded pin connection, each threaded pin connection including a threaded pin end profile configured to mate with the common threaded box end profile, a first non-conductive coating deployed on threads on at least one of the threaded pin end profile and the threaded box end profile at either end of the cylindrical pin body;
   each cylindrical pin body transitioning into t h e corresponding threaded pin end profile via an isolating portion, each isolating portion including a shoulder formed in the cylindrical pin body, each shoulder including a planar annular shoulder face, each shoulder face oriented on a plane substantially transverse to a longitudinal axis of the cylindrical pin body and a ring cutout;
   two isolating rings made from conductive material, each isolating ring including first and second planar annular ring faces, a second non-conductive coating deployed on at least one of the first and second annular ring faces on each isolating ring;
   each isolating ring further including cylindrical inner and outer ring surfaces;

each isolating ring sized to fit over the threaded pin connection and onto the shoulder face on either end of the cylindrical pin body, each isolating ring further configured to separate one shoulder face from an opposing box end surface when the threaded box end profiles are threadably engaged on the threaded pin end profiles on either end of the cylindrical pin body and each isolating ring configured to be disposed in the ring cutout; and each isolating portion further including an annular recess formed in the cylindrical pin body such that, at either end of the cylindrical pin body, the recess prevents the cylindrical box body from making contact with the cylindrical pin body nearby the insolating ring when one of the threaded box end profiles is threadably engaged on the threaded pin end profile with one of the isolating rings located therebetween.

9. The gap sub of claim 8, in which, on at least one of the isolating rings, the second non-conductive coating is deployed on the inner ring surface and on both of the first and second annular ring faces.

10. The gap sub of claim 8, in which any non-conductive coating is avoided on the outer ring surface on at least one of the isolating rings.

11. The gap sub of claim 8, in which, on at least one end of the cylindrical pin body, the first non-conductive coating is deployed on threads on both of the threaded pin end profile and the threaded box end profile.

12. The gap sub of claim 8, in which the first and second non-conductive coatings are selected from the group consisting of:
    (a) ceramic;
    (b) plastic;
    (c) fiberglass; and
    (d) composite.

13. The gap sub of claim 8, in which at least one of the group consisting of the cylindrical box bodies, the cylindrical pin body and the isolating rings is made from non-magnetic material.

14. The gap sub of claim 8, in which at least one of the group consisting of the cylindrical box bodies, the cylindrical pin body and the isolating rings is made from a material selected from the group consisting of:
    (a) stainless steel; and
    (b) carbon steel.

15. An electrically isolating threaded joint in a tubular collar, comprising:

first and second conductive collar members, the first collar member providing male threads on one end mating with female threads provided on one end of the second collar member, a non-conductive thread coating electrically isolating the mating male threads and female threads, the first and second collar members further each providing opposing substantially planar annular shoulder surfaces;

an isolating ring interposed between the opposing shoulder surfaces of the first and second collar members, the isolating ring providing first and second planar annular ring faces, each ring face contacting a corresponding one of the opposing shoulder surfaces of the first and second collar members, the isolating ring further providing cylindrical inner and outer ring surfaces;

a non-conductive ring coating deployed on at least one of the first and second ring faces; and an annular recess and a ring cutout in the first collar member preventing contact between the first and second collar members nearby the isolating ring.

16. The electrically isolating threaded joint of claim 15, in which the non-conductive ring coating is deployed on the inner ring surface and on both of the first and second ring faces.

17. The electrically isolating threaded joint of claim 15, in which any non-conductive coating is avoided on the outer ring surface.

18. The electrically isolating threaded joint of claim 15, in which the non-conductive thread coating and the non-conductive ring coating are selected from the group consisting of:
    (a) ceramic;
    (b) plastic;
    (c) fiberglass; and
    (d) composite.

19. The electrically isolating threaded joint of claim 15, in which at least one of the group consisting of the first collar member, the second collar member and the isolating ring is made from non-magnetic material.

20. The electrically isolated joint of claim 15, in which at least one of the group consisting of the first collar member, the second collar member and the isolating ring is made from a material selected from the group consisting of:
    (a) stainless steel; and
    (b) carbon steel.

* * * * *